Feb. 18, 1969   H. H. GOVE ET AL   3,427,685

PLASTIC PELLETIZER DIE PLATES

Filed March 3, 1967

INVENTORS
HARVEY H. GOVE &
JOHN C. ANDERSON
BY
Marechal, Biebel, French y Bugg
ATTORNEYS United States Patent Office 3,427,685
Patented Feb. 18, 1969

3,427,685
PLASTIC PELLETIZER DIE PLATES
Harvey H. Gove and John C. Anderson, Hamilton, Ohio, assignors to The Black Clawson Company, Hamilton, Ohio, a corporation of Ohio
Filed Mar. 3, 1967, Ser. No. 620,515
U.S. Cl. 18—12    7 Claims
Int. Cl. B29f 3/08

ABSTRACT OF THE DISCLOSURE

A pelletizer die plate is disclosed with an annular array of extrusion nozzles and fluid heating passages formed between adjacent radially aligned rows of nozzles, in which parallel-connected groups of heating passages are connected in a serpentine or reversing-flow manner between heating fluid inlets and outlets.

Background of the invention

This invention relates to the art of plastic pelletizing and more particularly to an improved die plate for use with plastic pelletizers. The die plate of this invention, in some of its aspects, is an improvement over the die plates shown in the U.S. patents of Hoffman et al. 3,230,582, issued Jan. 25, 1966, and Swickard et al. 3,287,764 issued Nov. 29, 1966, each assigned to the same assignee as this invention.

The die plates shown in the above-identified patents constitute substantial improvements over die plates which were previously available, and successfully permitted "critical" materials to be pelletized on a commercial basis. A "critical" material is a plastic material which has a relatively narrow band or range of temperatures in which it can be extruded for the purpose of forming pellets. Frequently such band or range of temperatures occur at relatively high absolute temperatures, and often a critical plastic material will suffer degradation if this band of temperature is exceeded. The die plate nozzles will rapidly block or freeze off if any part of the die plate is operated so that the temperature of the plastic material falls below the temperature band. Polypropylene, polyesters and nylon are examples of critical materials.

Prior to the advent of the die plates constructed according to the above-identified patents, the pelletizing of critical plastic materials had not been accomplished on a commercial basis due to the fact that the existing commercial die plates did not provide for a uniformly high heat throughout the die plate providing each nozzle with substantially the same heat so that each nozzle operated at the same temperature. The result was that the plastic material in a number of the nozzles would be chilled below the critical temperature band and the remaining nozzles would then extrude at an accelerated rate causing long strings of plastic material, rather than uniformly sized pellets. The freezing off of some of the nozzles accelerated and aggravated the process due to the fact that the nozzles which remained operative became somewhat hotter due to the friction of excessive material moving through the working nozzles.

The problem was solved on a commercial basis by the dies of the above-identified patents employing a serpentine-like heating passageway extending through an annular array of the nozzles to apply substantially uniform heat to each nozzle of the array. However, for some applications, the arrangement of heating passages limited the amount of heating fluid which could be applied and in some cases it was not possible to apply sufficient heat to the die plate to permit cold start up of pellet cutting while cold water was against the cutting surface of the die plate.

Further, it was desirable in some cases to apply a greater amount of heat to the nozzles in order to increase the rate of polymer flow.

Summary of the invention

This invention is directed to an improved pelletizer die plate in which the heating passageways are arranged in parallel groups with alternate ends of such groups being connected so as to encompass at least one row of nozzles in a serpentine-like manner leading from a fluid inlet to an outlet. In the preferred embodiment, the number of these passageways which are connected together in parallel decreases as the fluid flows from the inlet to the outlet, thereby providing an acceletion of the fluid flow as it moves from the inlet to the outlet and an increase agitation or scrubbing action of the heating fluid with the passage walls. Preferably, the die is divided, for the purpose of heating, into a plurality of arcuately spaced segments each being associated with one or more inlets and outlets which it shares with the adjacent segments.

It is accordingly an important object of this invention to provide a pelletizing die plate having increased heating capacity in which groups of parallel-connected passageways have their alternate ends connected by angularly offset manifolds, directing the heating fluid first radially inwardly and then outwardly through an annular array of pelletizer nozzles.

A further object of this invention is the provision of a three-piece die plate for a pelletizer in which a relatively high quantity of heating fluid can be applied for the uniform heating of an annular array of generally radially aligned nozzles.

A further object of this invention is the provision of a pelletizer die plate in which a plurality of heating passageways are connected in common with alternate ends of groups of such passageways opening into internal manifolds to form an inward and outward flow path for heating fluid, and in which the number of such passageways decreases from the inlet to the outlet providing for the increased rate of fluid flow as the heating fluid passes through the die plate.

These and other objects and advantages of the present invention will be apparent from the following description, the acompanying drawings and the appended claims.

Description of the preferred embodiment

Figure 2:
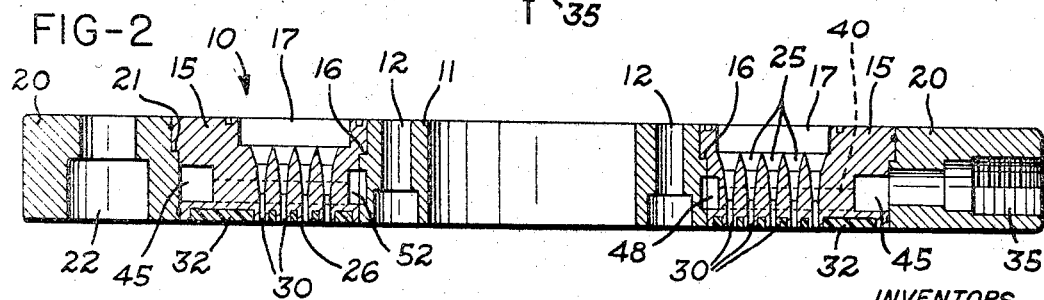
FIG. 2 is a transverse section through the die plate taken generally along the line 2—2 of FIG. 1.

Referring to the drawings which illustrate the preferred embodiment of the invention, the improved die plate is shown at 10 having a die body of three-piece construction including a circular inner section 11. The inner section 11 is formed with a series of bolt openings 12 for mounting and supporting the die plate 10 centrally on a suitable pelletizer mandrel or other support. The die plate body further includes an intermediate section 15 which is welded to the inner section 11 and which mounts in coaxial relation to the inner section 11 on steps or joints 16 to assure precision of alignment and assembly. The intermediate annular section 15 defines an annular extrusion zone 17 of reduced thickness, as seen best in FIG. 2, the details of which are described in greater detail below. The die plate 10 further includes an annular outer section 20 which is similarly welded to the outer periphery of the section 15 and which is formed with shoulders or steps 21 to facilitate alignment. The outer section 20 is formed with a series of annular bolt openings 22 for securing the die plate peripherally to the pelletizer body. The three-piece construction of the die plate and the particular advantage of this construction in a die plate are described in greater detail in Patent No. 3,287,764.

Figure 1:
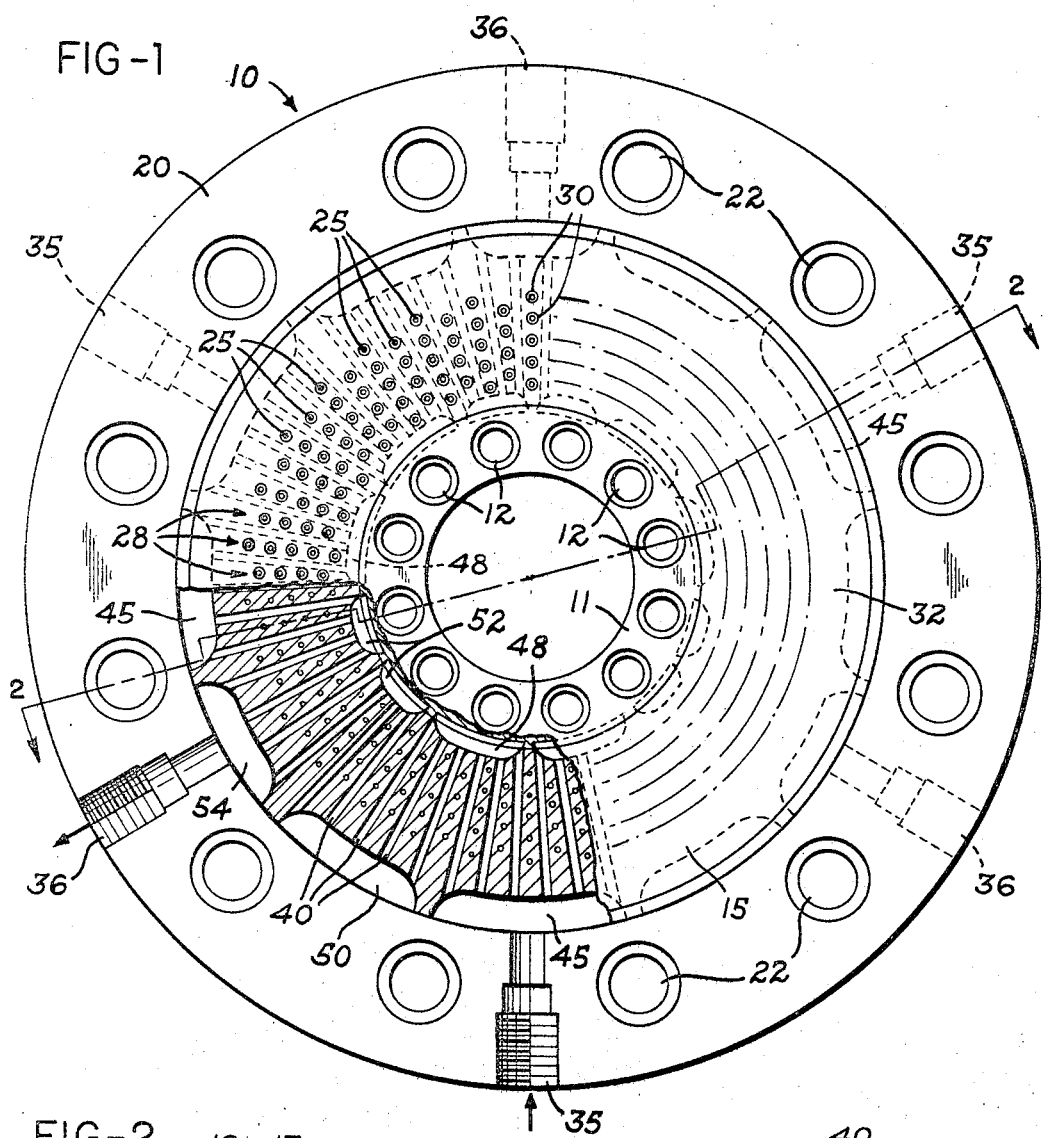
FIG. 1 is a plan view, partially broken away, of a die plate constructed according to this invention.

Referring to the intermediate section 15, the extrusion zone 17 defines a series as an annular array of axially extending extrusion orifices 25. The orifices 25 extend through the intermediate sections 15 from the rear surface thereof to the front surface and define, at the front surface, a cutting plane 26 at which pellets are severed by suitable rotating knives as the plastic material is extruded. Referring to FIG. 1, it may be seen that the orifices 25 are arranged in generally radially extending evenly spaced nozzle rows 28, spaced around the entire annular zone 17, with the orifices 25 in adjacent rows being radially staggered in relation to each other. As shown, there are rows 28 of nozzles alternating with adjacent rows 28 of nozzles which are in radially staggered relation to each other, providing a relatively high density of extrusion nozzles within the zone 17.

The face or cutting surface 26 of the die plate 10 at the intermediate section 15 is undercut forming a recess surrounding each of the tips 30 of the nozzle orifices 25 within which suitable insulation 32 is formed, such as by packing under pressure. The insulation 32 serves to insulate the die plate, and the nozzles in particular, from chilling due to direct contact of water with the face surface 26 when the die plate is used in an underwater pelletizer.

Means in the die plate for applying heating fluid to the interior of the intermediate section 15 for the purpose of uniformly heating each of the orifices 25 to maintain a precise extrusion temperature through the nozzles includes a plurality of arcuately spaced inlets 35 formed in the outer section 20, and a corresponding plurality of outlets 36 which are positioned substantially between the inlets 35. The die is thus divided, for the purpose of hot fluid heating, into a plurality of heating zones, a heating zone being defined as the arcuate segment of the die between an inlet 35 and an outlet 36.

The intermediate section 15 of the die plate is formed with a plurality of transversely or arcuately spaced fluid conducting passages 40 extending radially through the intermediate section between each adjacent row 28 of nozzle orifices. The passages 40 extend radially through the intermediate section 15 from the outer to the inner surfaces thereof and thus extend from positions generally radially outwardly of the array of nozzles to positions generally radially inwardly of the nozzles, there being at least one passage 40 formed in the space between each adjacent radial row 28 of nozzles.

Figure 3:
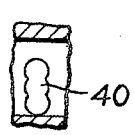
FIG. 3 is a fragmentary section showing one of the heating fluid passages.

As shown in FIG. 3, one passage 40 may conveniently consist of three intersecting drilled openings axially positioned one above the other to provide a single relatively large opening 40 to handle a correspondingly high capacity of fluid flow. As shown by the broken lines in FIG. 2, the passage 40 thus formed is of substantial axial extent as compared to the axial length of the orifices 25, providing for maximum application of heat from the passage 40 to the individual orifices 25. Also, the passages 40 are positioned as close to the cutting surface 26 inwardly of the insulation 32 as practicable to apply heat close to the extrusion ends of the individual nozzles, and to compensate for the heat being removed at the cutting face 26 by its direct contact with water. Alternately, the passage 40 may comprise a plurality of, or grouping of, individual passages, such as a rectangle array of four individual openings. However, the arrangement shown is preferred since it is adapted to be accommodated in the space between adjacent rows 28 of orifices, which space becomes more restricted at the radially inward portions of the intermediate section 15.

The heating fluid passages 40 are joined to form continuous flow paths at the inner and outer die sections by means of suitable internal arcuately overlapping manifolds formed between these sections and the adjacent surface of the intermediate die section 15. The manifolds are preferably formed so as to divide the passages 40 into parallel-connected groups of passages, to provide for flow of heating fluid from an inlet inwardly through at least two, and preferably three, of such passages, then outwardly through a similar group of passages, and preferably for return flow inwardly and then finally outwardly to communicate with an outlet 36. The flow path formed may thus be considered as being serpentine-like with respect to the intermediate section 15.

For this purpose, the intermediate section 15 may be considered as having means forming a first outer manifold 45 communicating with an inlet 35 enjoining in common the ends of a plurality of the passages 40, dividing symmetrically into lefthand and righthand flow patterns from the inlet 35. As shown in FIG. 1, the outer manifold 45 communicates with six passages 40, three to the left of the inlet, and three to the right. The three passages 40 to the left have inner ends which open into means defining a first inner manifold 48. The inner manifolds as well as the outer manifolds may be formed entirely within one die section such as the inner section 15 as in the case of the outer manifolds, or may be formed partially within adjacent die sections as in the case of the inner manifolds. Since the inner manifold 48 is arcuately displaced in overlapping relation to the outer manifold 45 it, in turn, communicates with a corresponding second group of pasages 40 at their inner ends for redirecting the heating fluid outwardly to a second outer manifold 50. The second outer manifold joins the second plurality of passages with a third plurality of passages 40 through which the heating fluid is redirected radially inwardly into a second inner manifold 52, at which the fluid is redirected radially outwardly through a fourth plurality of passages and into a third outer manifold 54 communicating with an outlet 36.

Preferably, fewer parallel-connected passages 40 open into the outlets 36 than open into the inlets 35. In the preferred embodiment shown, while three passages 40 communicate between the manifolds 45, 48 and 50, there are only two passages communicating between the manifolds 50, 52, and 54, providing a flow path grouping which may be written as 3–3–2–2–. This reduction in the number of parallel-connected groups of passages between an inlet 35 and an outlet 36 provides a corresponding increase in fluid flow rate as the fluid moves past the nozzles from the inlet 35 to the outlet 36. This increase in flow rate provides a corresponding decrease in the laminar flow characteristic in the fluid as it moves between the inlets and the outlets and an increase in scrubbing action, thus increasing the rate of heat transmission through the passage walls to the nozzles 25 as the fluid moves toward the outlets 36.

In the operation of the die plate of this invention, hot fluid which may be steam but is preferably hot oil, is applied simultaneously to the inlets 35 prior to the time that the pelletizer is put into action. The heated fluid is pumped through the inlets 35 and the serpentine-like heating fluid passageways formed therethrough to the several outlets 36, to bring the die plate up to operating temperature. At this point, if water has not already been admitted into the pellet collecting housing it can be so admitted and the extruder and knives started into operation to cause the severing of the pellets at the cutting face 26.

The heating arrangement described herein is such that a sufficiently high temperature can be achieved and maintained in the nozzles, even with water in direct contact with the surface 26, to permit cold start-up and pelletizing of critical materials, such as nylon, polypropolene, and high melt polyesters. Frequently, these materials have a relatively narrow band or melt point temperatures which may be from 5–15°, and relatively high melt points of from 450–500° F. or more. In order to achieve and maintain these temperatures in the plastic material, it is necessary to operate the die plate itself at even higher temperatures, and oil temperatures of 700–750° F. or more may be used. The arrangement of the pasages 40 closely adjacent to the cutting surface 26 provides a highly efficient construction and one in which the temperature drop to the cutting surface 26 is relatively abrupt and in which each nozzle will receive substantially the same quantity or degree of heat input so that none of the nozzles will freeze off but all will be operated at substantially the same temperature.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a die plate for plastic pelletizers in which a series of knives move in succession in cutting relation to an annular array of plastic extruding nozzles, said nozzles being arranged in said die plate in a plurality of generally radially extending rows, the improvement in die plate heating comprising means in said die plate defining in a plurality of heating fluid inlets and a plurality of outlets arcuately spaced from said inlets dividing said die plate into arcuate sections for the purpose of heating corresponding arcuate sections of said nozzle array, means in said die plate defining a plurality of generally radially extending heating passages extending from positions generally radially inwardly of said nozzle array to positions generally radially outwardly of said array, there being at least one said passage formed in the space between adjacent said rows of nozzles, means connecting alternate ends of groups of said passages, and each said group of passages encompassing at least one row of said nozzles to effect a serpentine-like flow of heating fluid leading from each said inlet to one of said outlets providing in each of said arcuate sections multiple parallel-connected flow paths for the application to said nozzles of heat from said fluid.

2. The die plate of claim 1 in which said heating passages connecting means comprises arcuately spaced manifolds formed at locations alternately radially inwardly and outwardly of said nozzle array, and in which alternate ones of said outer manifolds open into either a said inlet or a said outlet.

3. The die plate of claim 2 in which said parallel-connecting groups of passages decrease in number between said inlets and said outlets providing an increase in fluid flow rate as said fluid moves from each said inlets to said outlets.

4. In a die plate for plastic pellitizers in which a series of knives move in succession in cutting relation to an annular array of plastic extruding nozzles, said nozzles being arranged in said die plate in a plurality of generally radially extending rows, the improvement in die plate heating comprising means in said die plate defining a plurality of generally radially extending heating passages extending from positions generally radially inwardly of said nozzle array to positions generally radially outwardly of said array, there being at least one said passage formed in the space between each adjacent said rows of nozzles, means in said die plate defining a plurality of arcuately spaced heating fluid inlets and a plurality of arcuately spaced heating outlets positioned substantially between said inlets dividing said nozzle array into a plurality of arcuate heating zones, first outer manifold means for each said zone in said die plate communicating with the associated said inlet and joining a first plurality of said passages for the application of heating fluid thereto, first inner manifold means positioned inwardly of said nozzle array arcuately spaced in relation to said first outer manifold means and joining said first plurality of passages with an adjacent second plurality of said passages redirecting the flow of said heating fluid radially outwardly of said array, second outer manifold means in said die plate joining said second plurality of passages with an adjacent third plurality of passages redirecting said heating fluid inwardly of said array, second inner manifold means joining said third plurality of passages with an adjacent fourth plurality of passages redirecting said heating fluid radially outwardly of said array, and third outer manifold means joining said fourth plurality of passages with a said outlet.

5. The die plate of claim 4 in which the number of passages in said fourth plurality of passages is less than that of said first plurality of passages providing an increase in the rate of flow as said heating fluid moves from an inlet to an outlet.

6. An improved die plate for a plastic pelletizer, comprising an annular intermediate section having means defining a plurality of axially extending orifices through which the plastic material is extruded, said intermediate section further including a series of generally radially extending passages spaced between rows of said orifices for conducting heating fluid through said intermediate section in close proximity to said orifices, an inner section spaced within said intermediate section and connected thereto for closing the inner ends of said radially extending passages, an annular outer section surrounding said intermediate section and connected thereto for closing the outer ends of said generally radially extending passages, said outer section having means defining a series of inlets and outlets for receiving and discharging heating fluid, and manifold means formed arcuately alternately generally in the region of intersection of said outer and inner die sections with said intermediate die section, each said manifold means having an arcuate length sufficient to encompass a plurality of said passages and connecting the ends of groups of said passages together associated with corresponding pluralities of said nozzle rows for connecting said groups of passages in a serpentine-like manner from each said inlet to said outlet.

7. An improved die plate for a plastic pelletizer, comprising an annular die plate body having inner and outer manifold forming surfaces, means defining a plurality of circumferentially spaced passages extending within said body from said outer surface to said inner surface, a plurality of orifices extending axially through said plate between adjacent said passages, closure means on said body connected to said inner and outer surfaces of said plate body and cooperating to define a plurality of angularly spaced inner manifolds and outer manifolds arranged in overlapping relation to said passages and to each other, each said inner manifold interconnecting the inner ends of at least three of said passages and each said outer manifold interconnecting the outer ends of at least three of said passages, with each said passage extending between an inner and an outer manifold, means defining a fluid inlet opening into one of said outer manifolds for the circulation of heating fluid inwardly of said die plate into an inner manifold and outwardly to another said outer manifold, and means in a said outer manifold defining a fluid outlet for removal of heating fluid from said die plate.

References Cited
UNITED STATES PATENTS

| | | |
|---|---|---|
| 2,931,408 | 4/1960 | Dwyer et al. |
| 3,114,169 | 12/1963 | Palmer et al. |
| 3,230,582 | 1/1966 | Hoffman et al. |
| 3,271,821 | 9/1966 | Street. |
| 3,271,822 | 9/1966 | Rhino. |

WILLIAM J. STEPHENSON, *Primary Examiner.*